United States Patent

Zaborszki

[11] Patent Number: 5,404,632
[45] Date of Patent: Apr. 11, 1995

[54] METHOD OF FORMING FLEXIBLE METAL HOSE CONNECTOR

[75] Inventor: Stephen J. Zaborszki, Bedford, Ohio

[73] Assignee: Swagelok Quick-Connect Co., Hudson, Ohio

[21] Appl. No.: 897,441

[22] Filed: Jun. 2, 1992

[51] Int. Cl.⁶ ............................................. B21D 39/00
[52] U.S. Cl. .................................. 29/508; 29/890.144; 29/520; 29/512
[58] Field of Search .............. 29/508, 515, 516, 517, 29/520, 890.144, 237, 512; 285/286

[56] References Cited

U.S. PATENT DOCUMENTS

| | | |
|---|---|---|
| 1,481,341 | 1/1924 | Bersted . |
| 2,002,121 | 5/1935 | McMaster ............................ 29/508 |
| 2,028,600 | 1/1936 | Guarnaschelli ................... 29/508 X |
| 2,172,532 | 9/1939 | Fentress . |
| 2,216,686 | 10/1940 | Fentress ............................ 29/508 |
| 2,300,517 | 11/1942 | Milton . |
| 2,300,547 | 11/1942 | Guarnaschelli . |
| 2,310,536 | 2/1943 | Melsom . |
| 2,444,988 | 7/1948 | Guarnaschelli . |
| 2,473,879 | 6/1949 | Guarnaschelli . |
| 3,023,496 | 3/1962 | Millar ................................ 29/508 X |
| 3,180,203 | 4/1965 | Vaughin ........................... 29/520 X |
| 3,239,931 | 3/1966 | Guarnaschelli ...................... 29/520 |
| 3,590,455 | 7/1971 | Harris ............................. 29/890.144 |
| 3,740,832 | 6/1973 | Toepper ............................ 29/508 X |
| 4,227,639 | 11/1980 | Blumenberg ................... 285/286 X |
| 4,527,819 | 7/1985 | Desilets et al. .................. 285/287 X |
| 4,544,187 | 10/1985 | Smith ................................ 29/508 |
| 4,887,853 | 12/1989 | Flowers et al. ................ 29/523 X |
| 5,069,253 | 12/1991 | Hadley ........................... 295/286 X |
| 5,172,477 | 12/1992 | Hadley ...................... 29/890.144 X |

Primary Examiner—Timothy V. Eley
Assistant Examiner—Khan V. Nguyen
Attorney, Agent, or Firm—Fay, Sharpe, Beall, Fagan, Minnich & McKee

[57] ABSTRACT

A fitting is secured to a flexible metal hose comprised of a corrugated tube, braid, and sleeve in a manner that provides a single weld operation. An end of the tube is axially compressed to define a generally planar surface with the braid and sleeve ends. Thereafter, a consumable flanged fitting is welded in a single weld to integrally secure all four components, namely, the tube, braid, sleeve, and fitting together.

8 Claims, 6 Drawing Sheets

METHOD OF FORMING FLEXIBLE METAL HOSE CONNECTOR

BACKGROUND OF THE INVENTION

This invention relates to the art of flexible metal hose and more particularly to a method of preparing a flexible metal hose and securing a connector or fitting thereto, as well as the assembly obtained thereby. The invention is particularly applicable to flexible metal hose that is comprised of an inner corrugated tube which is covered by a sheath of braided metal wire. Any one of a number of fluid fittings may be secured to ends of the flexible metal hose, and it is envisioned that opposite ends of the flexible metal hose may even incorporate different types of fittings. The assembly finds application in installing flexible loops that allow for thermal expansion, misalignment, intermittent flexing, or continuous flexure, for example as may be caused by vibration. Of course, and as will be readily understood, it may also be used for static bend arrangements. These uses and the environment are merely exemplary, and it will be appreciated that the invention may be advantageously employed in still other environments and applications.

A conventional, prior art method of assembling a flexible metal hose connector incorporates two separate welding operations. As used herein the term "welding" is to be accorded its broadest interpretation and encompasses various types of welding as well as the concepts of brazing and soldering. An alternate expression for welding is fusion bonding and these terms will generally be used synonymously.

According to one prior art method of assembling flexible metal hose, the corrugated tube and the braided sheath are terminated at a desired location. A sleeve is then advanced over the metal braid and aligned with the terminal ends of the tube and braid. A first weld, known as a cap weld, joins the sleeve, braid, and tube together. Thereafter, a fitting is advanced into abutting engagement with the first weld area, and a second weld, particularly a fillet weld, joins the external periphery of the fitting to the terminal end of the metal hose, i.e., the welded sleeve, braid, and tube.

Although this method of assembly has been used with a tremendous amount of commercial success, a primary drawback is that it relies on the skill of the individual welder. Variations may occur from one metal hose connector to another, whether assembled by the same or different welders. For example, the welder secures the tube, braid, and sleeve together in the first weld step. These three components may not be concentrically secured together, or one of the components may not be effectively secured to the other two components. The welder must also provide a generally planar surface to adapt the intermediate assembly to receipt of the fitting. Again, such steps are labor intensive and subject to variation from one completed flexible metal hose connector to another.

A number of other methods have been proposed in prior art patents. These include U.S. Pat. Nos. 2,172,532—Fentress; 2,473,879—Guarnaschelli; 4,527,819—Desilets, et al.; 3,740,832—Toepper; 2,028,600—Guarnaschelli; 2,444,988—Guarnaschelli; and 2,300,547—Guarnaschelli. The subject invention, though, is believed to offer a number of advantages over these prior art arrangements.

SUMMARY OF THE INVENTION

The present invention contemplates a new and improved apparatus and method that overcomes various deficiencies in the prior art, and simplifies the process of securing a fitting to a flexible metal hose.

According to the invention, a flexible metal hose comprises an inner tube, a braid received over the tube, and a sleeve received over the braid. A fitting is secured thereto by locating the sleeve relative to the end of the tube. The sleeve is thereafter deformed to mechanically interlock the sleeve, braid, and tube together. The tube is then axially deformed, a fitting located on the deformed surface, and the fitting thereafter welded to the sleeve, braid, and tube.

According to another aspect of the invention, the braid end is spread radially outward after the sleeve deforming step.

According to yet another aspect of the invention, the radially spread braid end is cut at its interface with the sleeve.

According to a still further aspect of the invention, the fitting is provided with a radially enlarged or extending shoulder that becomes the consumable material during the welding step.

A principal advantage of the invention is the ability to perform a single weld to secure a fitting to a flexible metal hose, i.e., the tube, braid, sleeve and fitting are joined together in the single weld.

Yet another advantage of the invention results from the increased number of hose connectors that may be completed per hour.

Still another advantage resides in the better quality of the hose assembly, e.g., better concentricity, straightness, and overall aesthetics.

Still another advantage is found in the consistency of the completed hose assemblies and increased performance.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in the specification and illustrated in the accompanying drawings which form a part hereof, and wherein.

DETAILED DESCRIPTION OF THE PREFERRED EMBODIMENT AND METHOD

Figure 1:
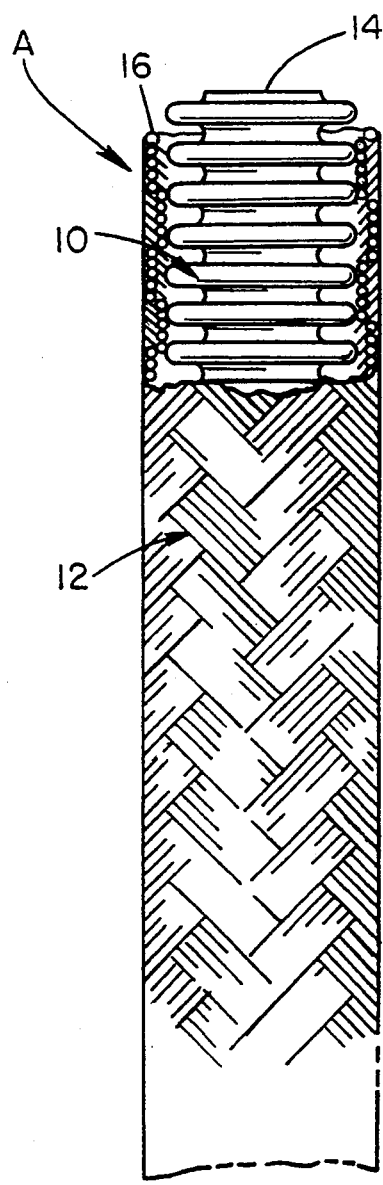
FIG. 1 is an elevational view partly in cross section of two primary components of a flexible metal hose.

Referring now to the drawings wherein the showings are for purposes of illustrating the preferred embodiment and method of the invention only and not for purposes of limiting same, the figures show a flexible metal hose A to which is secured a fitting B in a preferred manner and according to a preferred method of assembly.

Figure 2:
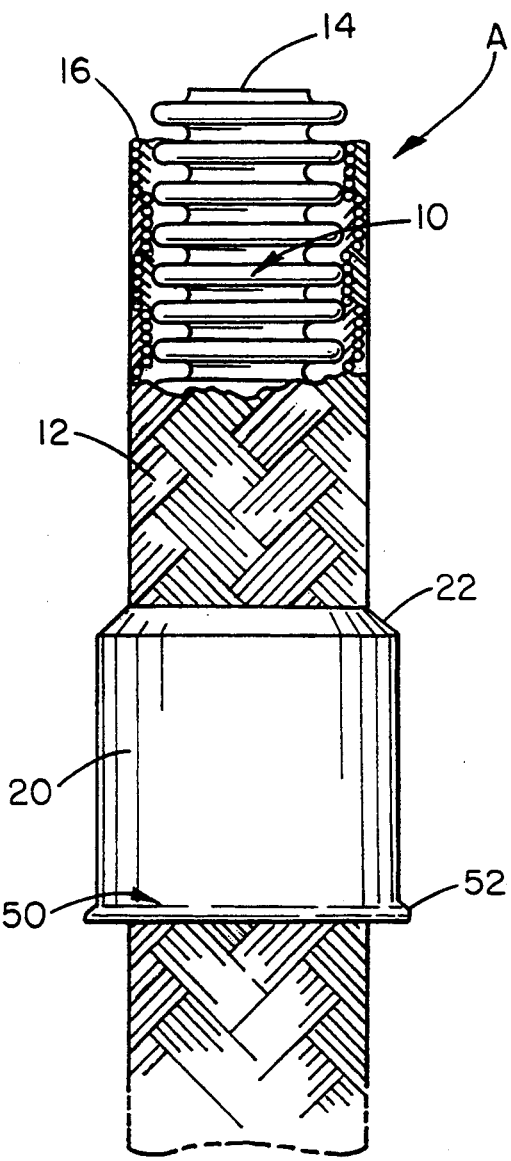
FIG. 2 is similar to FIG. 1 and in which a third component is advanced over the hose.

More particularly, and with reference to FIGS. 1 and 2, the flexible metal hose A comprises an inner corrugated tube 10 and a surrounding sheath or metal braid 12. As shown, the corrugated tubing is defined by a series of concentric corrugations, although it will be understood that in other applications helical corrugations may be used with equal success. Generally, the corrugations are equally spaced apart in the longitudinal direction whether helical or concentric corrugations are used. Further, according to a preferred arrangement, the hose is a type 316 stainless steel, while the braid is a type 321 stainless steel. As will be readily understood by one skilled in the art, these materials are exemplary only since still other materials may be suitable for different purposes.

Ends 14, 16 of the tube and braid, respectively, are terminated in any well known manner. As shown in FIGS. 1 and 2, the ends 14, 16 are longitudinally or axially aligned, but as will become apparent below, the tube and braid can initially be moved axially relative to one another.

A sleeve 20 is placed over the tube and braid (FIG. 2), and has an interior diametrical dimension slightly greater than the braid to permit it to be moved axially relative thereto. The sleeve is preferably a hollow cylindrical member having a chamfered end 22 that is positioned to face the terminal ends 14, 16 of the tube and braid for reasons which will become more apparent below. Again, and although other materials can be used for different purposes, in the preferred arrangement the sleeve is a 316 stainless steel.

Figure 3:
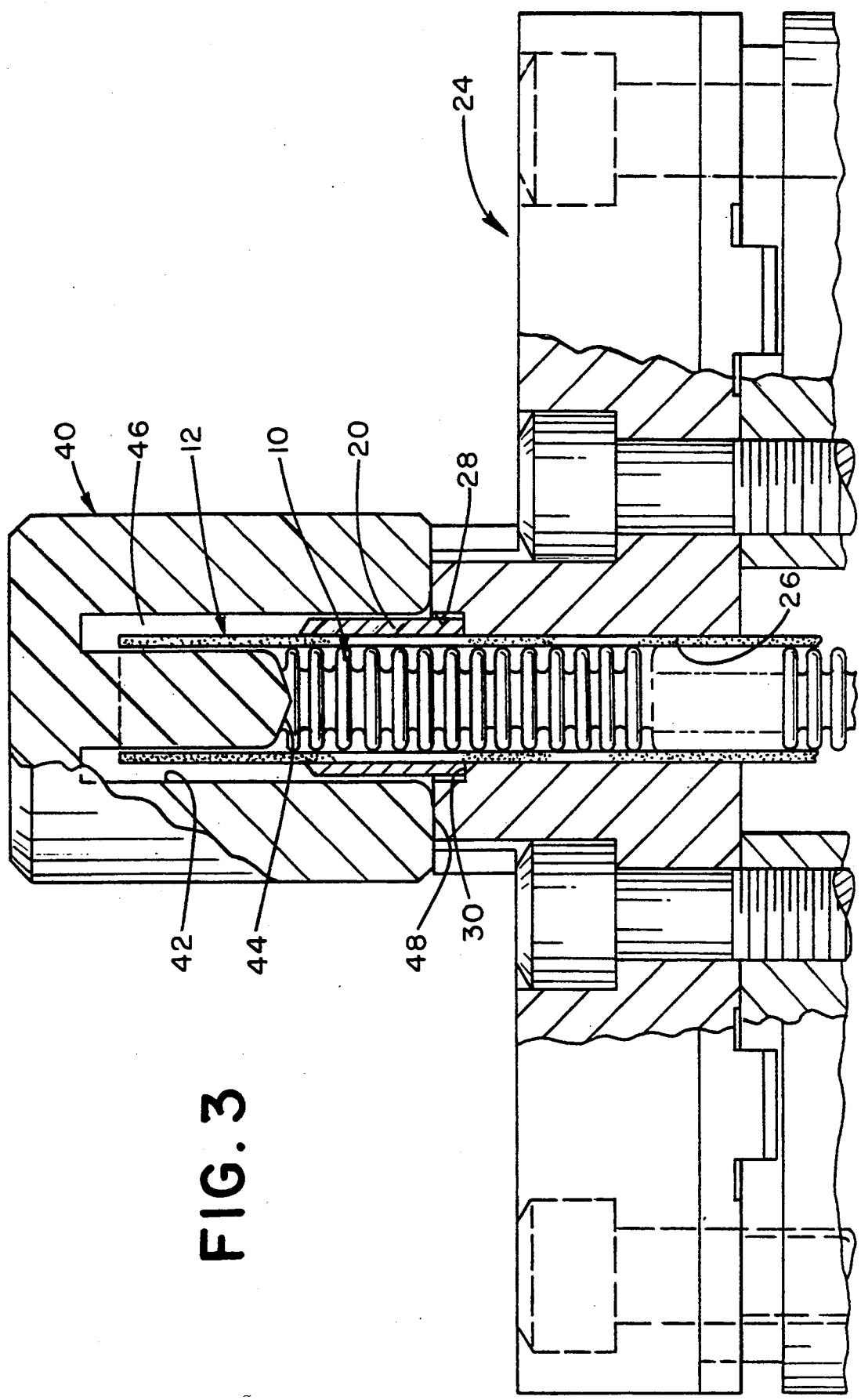
FIG. 3 is a cross-sectional view of the flexible metal hose of FIG. 2 disposed in a gauge for locating the components of the flexible metal hose.

The assembly of FIG. 2 is located in a work support 24 such as a set of cooperating chuck jaws (FIG. 3). The end of the metal hose to receive the fitting extends outwardly from a through opening 26 in the work support. At an axial outer end of the through opening, a counterbore 28 defines a radial shoulder 30. As illustrated, the counterbore is dimensioned to closely receive the sleeve and support the sleeve on shoulder 30, and the chamfered end 22 extends outwardly a preselected dimension from the work support.

A gauge 40 is positioned over the axially outer ends of the hose assembly components, i.e., the tube, braid, and sleeve. More particularly, the gauge includes a closed end cylindrical recess 42 diametrically dimensioned for receipt over the sleeve. An axially extending locating nose 44 protrudes into the recess toward the open end thereof defining an annular cavity 46. The nose has a diametrical dimension approximately equal to the diameter of the corrugated tube 10 so that the tube cannot extend into cavity 46. As shown in FIG. 3, the diameter of the nose is also less than the braid thereby permitting the braid to extend therepast.

An inner end 48 of the gauge abuts against the work support 24. The terminal end of the flexible hose is thus received in the gauge in a manner so that the nose 44 abuts against tube end 14. The braid 12 is permitted to extend into the annular cavity, while the sleeve essentially remains unaffected by the gauge, being supported by shoulder 30 of the work support. Advancement of the gauge and relative positioning of the components of the flexible metal hose axially locate the chamfered end 22 of the sleeve relative to the tube end 14. This is the critical relationship defined by the gauge as will become apparent below. The extent of receipt of the braid 12 in the annular cavity is not as critical. As long as the braid end extends past the chamfered end of the sleeve and the end of the tube, further positioning thereof is unnecessary.

The end 50 of the sleeve opposite the chamfered end 22 may also be modified to include a slight protrusion or shoulder 52 that assists in holding the sleeve in place during the locating step described above. This modification is illustrated in FIG. 2 but not in the remaining views. It will be understood that the shoulder is preferably circumferentially continuous if incorporated into the assembly. Similarly, suitable modification to the internal configuration of the work support surrounding the lower end of the sleeve will be required to accommodate the shoulder and accurately hold the sleeve in position.

Figure 4:
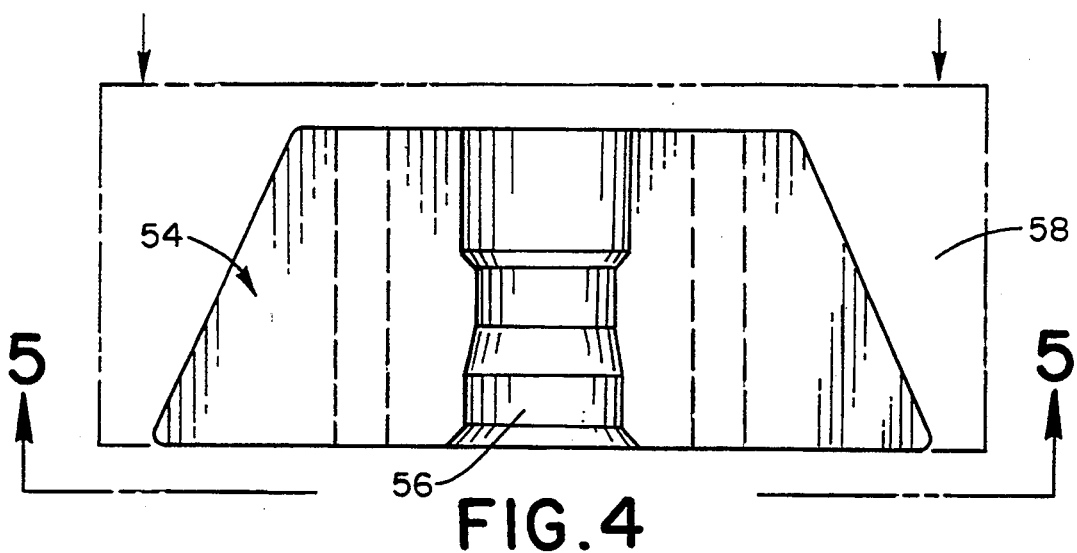
FIG. 4 is an elevational view of one of a pair of cooperating swaging dies for mechanically deforming the sleeve and interlocking the components of the flexible metal hose, a cooperating swaging cup being shown in phantom.
Figure 5:
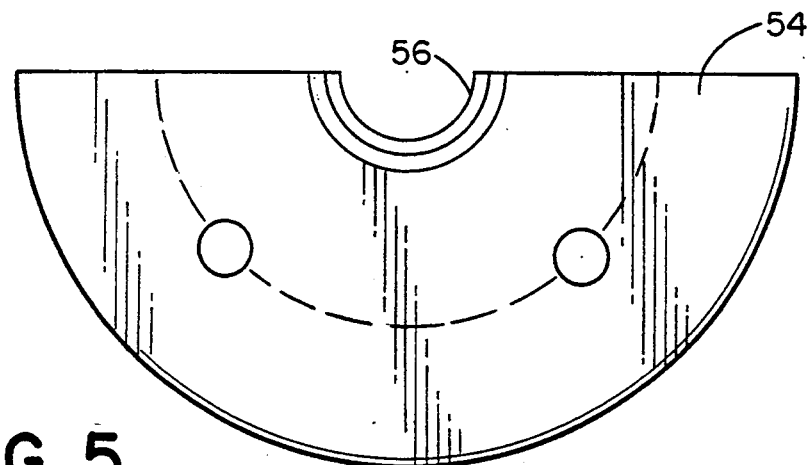
FIG. 5 is a view of the swaging die taken generally along the lines 5—5 of FIG. 4.
Figure 6:
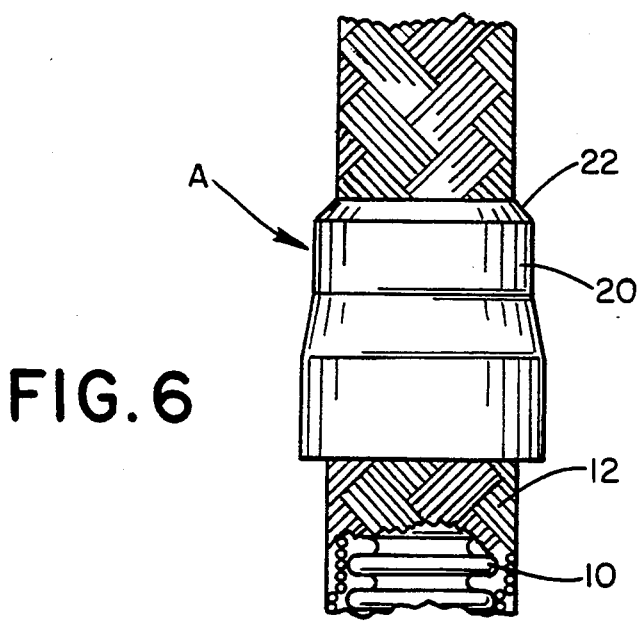
FIG. 6 is an elevational view partly in cross section of the flexible hose after the swaging operation.

While held in place by the work support or chuck jaws 24, the gauge is removed and a pair of swaging dies 54 positioned around the sleeve 20. One of the swaging dies is shown in elevation and plan views in FIGS. 4 and 5. As is well known in the art, the swaging dies are adapted to radially deform the work piece, in this particular instance the terminal end of the flexible hose. More specifically, each swaging die 54 includes a contoured cavity 56. A swaging cup 58, shown in phantom in FIG. 4, is axially advanced over the swaging dies to perform the radially inward deformation of the sleeve. This deforming step mechanically interlocks the sleeve, braid, and tube together. Particularly, the non-chamfered end of the sleeve remains substantially unaffected, while the intermediate portion and chamfered end of the sleeve are swaged to lock the components of the flexible hose together. After the swaging operation, the tube, braid, and sleeve cannot be moved axially relative to one another. The result of the swaging, or crimping, or rolling operation is illustrated in FIG. 6, in which the sleeve has been radially deformed to interlock the hose components together.

Figure 7:
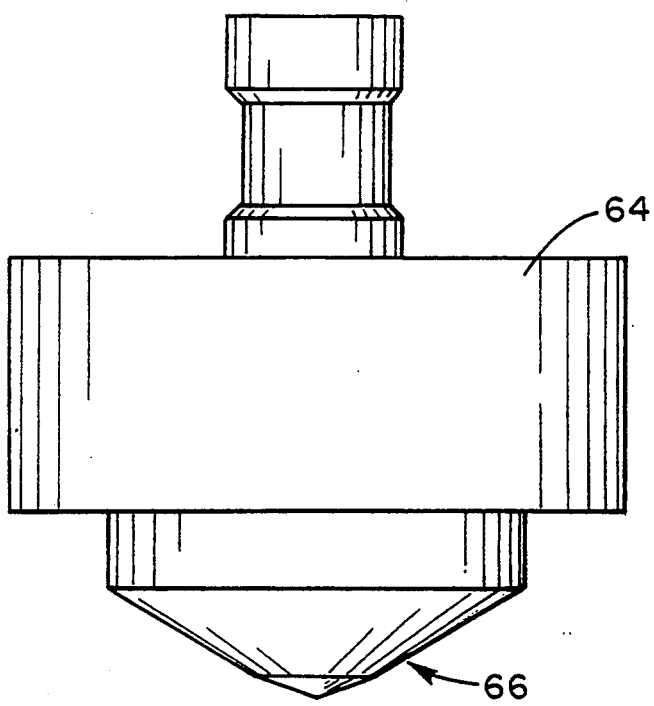
FIG. 7 is a cross-sectional view of a pre-peening tool.
Figure 8:
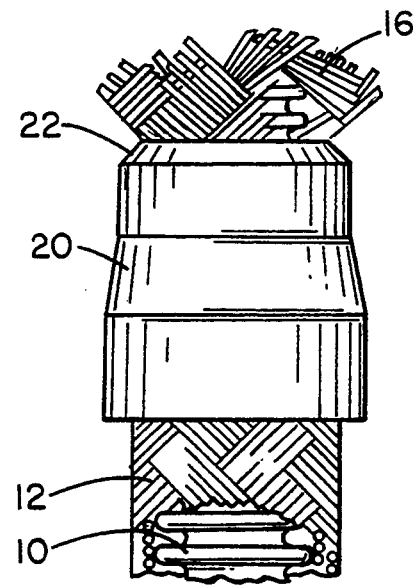
FIG. 8 is an elevational view partly in cross section of the flexible hose after the pre-peening operation.

Turning now to FIGS. 7 and 8, after the swaging dies are removed, a pre-peening tool 64 is axially advanced toward the terminal end of the flexible hose. The primary function of the pre-peening tool is to radially spread the braid end 16 outwardly by virtue of tapered surfaces 66. That is, the tapered surfaces are dimensioned for receipt in the portion of the braid that extends outward from the ends of the tube and sleeve after the locating step of FIG. 3 and the swaging step of FIGS. 4 and 5. As best illustrated in FIG. 8, the result of this pre-peening operation flares the braid end radially outward. The remainder of the flexible metal hose essentially remains unchanged.

Figure 9:
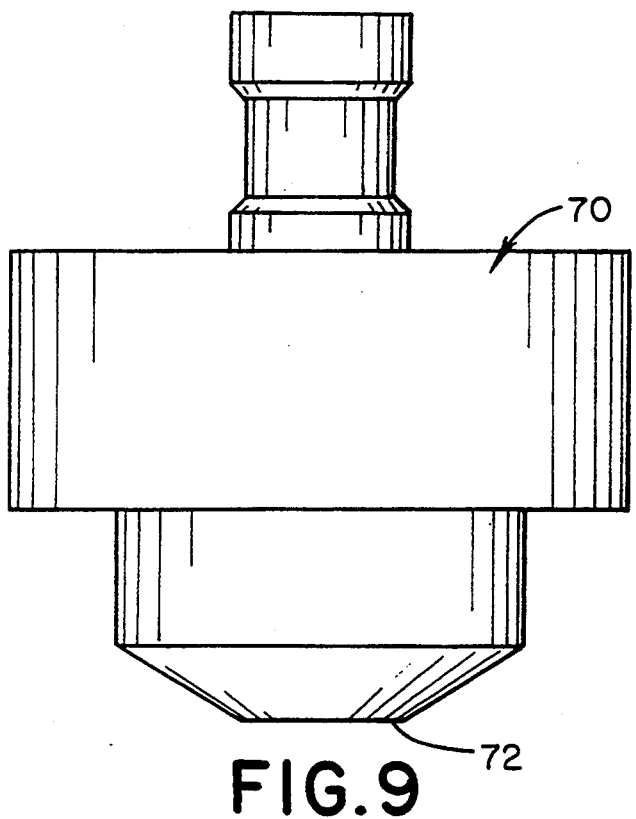
FIG. 9 is a cross-sectional view of a peening tool.
Figure 10:
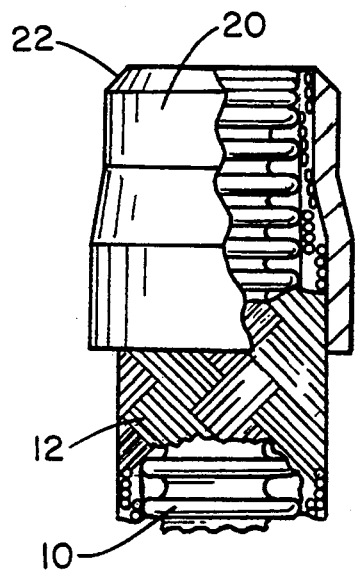
FIG. 10 is an elevational view partly in cross section of the flexible hose after the peening operation.

A peening tool 70 (FIG. 9) is next axially advanced against the end of the flexible metal hose. Particularly, its generally planar end surface 72 engages the tube end 14 and axially compresses or deforms the tube corrugate into a flush relationship with the sleeve end. In other words, the spacing between the individual corrugates of the tube is reduced at the chamfered end of the sleeve while the rest of the tube corrugations remain substantially equally spaced apart. Simultaneously, the peening tool serves the dual purpose of shearing the flared braid end from the flexible hose. The chamfered end 22 of the sleeve facilitates the shearing of the braid during this operation, serving as a cutting edge as the peening tool bottoms out against the sleeve. As shown in FIG. 10, and once the peening operation is complete, a generally planar surface is defined by the ends of the sleeve, braid, and tube.

Figure 11:
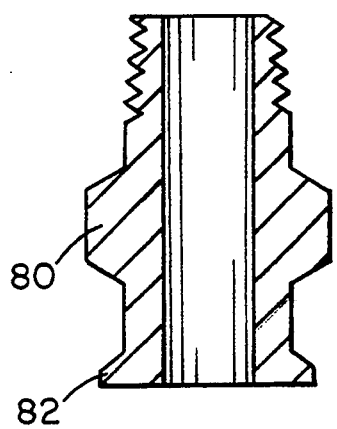
FIG. 11 is a cross-sectional view of one type of fitting adapted for securing to the flexible metal hose of FIG. 10.
Figure 12:
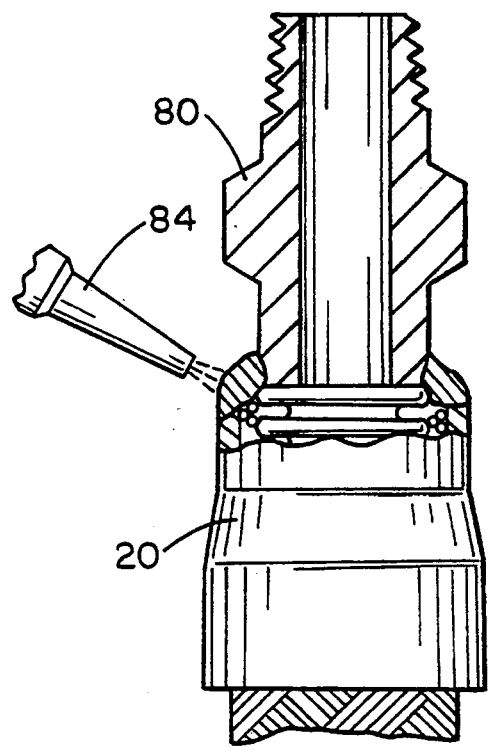
FIG. 12 illustrates the welding operation connecting the fitting to the flexible hose.
Figure 13:
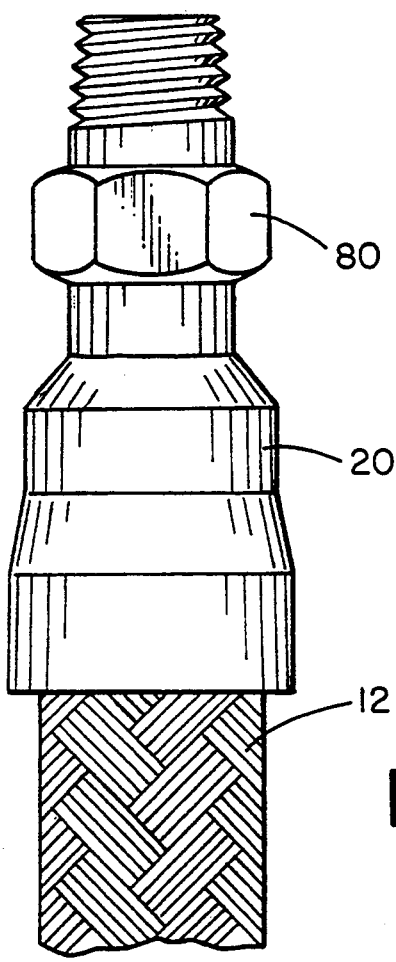
FIG. 13 is an elevational view of the assembled flexible metal hose connector; and, FIG. 14 is a greatly enlarged cross-sectional view of the completed flexible metal hose connector.

The end of the flexible metal hose is now prepared to receive any suitable fluid fitting. As shown in FIG. 11, a typical externally threaded male connector 80 is shown. The end of the connector or fitting 80 to be secured to the flexible metal hose is modified to incorporate a foot, shoulder or radial flange 82. As shown with reference to FIG. 12, the radial flange is dimensioned to mate with the diametrical dimension of the sleeve end, so that the fitting is accurately located, i.e., concentrically, relative to the hose end. Further, the flange 82 becomes the consumable material for the arc welding process illustrated in FIG. 12 and represented by weld head 84. The chamfered end of the sleeve is substantially consumed in the welding operation (FIG. 14) so that the aesthetics of the final hose assembly are also enhanced through use of the chamfered sleeve.

The cap weld arrangement of prior art arrangements is eliminated and only the single weld is required to join the fitting to the hose. Thus, in the final product, the sleeve, braid, tube, and fitting become integrally joined in the welding operation. Although the process has been described as an autogenous weld, i.e., not requiring a filler wire or material for the fusion bonding, it will be understood by those skilled in the art that the teachings of the subject invention are equally applicable to a similar process in which a filler wire is used.

Figure 14:
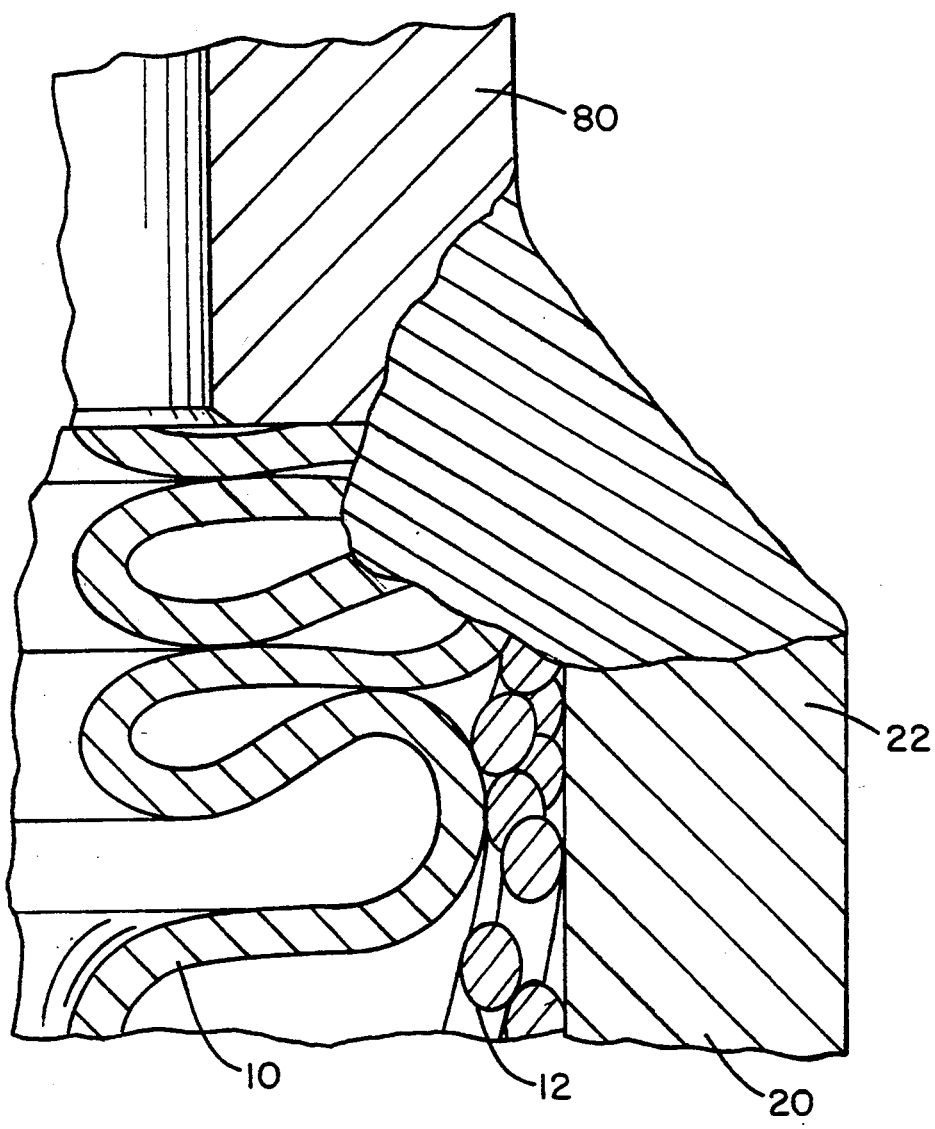

As particularly detailed in FIG. 14, the above-described process results in a flexible metal hose with an integral fitting in which all four components of the assembly are joined together in a single weld. The described method substantially reduces the time required to join a fitting to a flexible metal hose and overcomes much of the variability encountered with prior art methods. The subject invention provides a permanent welded connection that avoids problems associated with corrosive fluids, shock from pressure surges, temperature cycling, and system vibration. Of course, still other fittings may be used as opposed to the male connector, for example a union cross, union tee, elbow, adaptor, quick connect, etc.

The invention has been described with reference to the preferred embodiment. Obviously, modifications and alterations will occur to others upon a reading and understanding of this specification. For example, different materials of construction may be used, or different fittings may be secured to the flexible hose. The illustrated and described embodiment is not intended to be limiting. Rather, the subject invention is intended to include all such modifications and alterations insofar as they come within the scope of the appended claims or the equivalents thereof.

Having thus described the invention, it is now claimed:

1. A method of securing a fitting to a terminal end of a flexible metal hose that includes a corrugated tube, braid, and a sleeve having a chamfered edge, the method comprising the steps of:
    axially locating a tube end and braid end beyond a sleeve end to define an extended braid end portion;
    locking the tube, braid, and sleeve together after the locating step;
    radially spreading the braid end portion;
    cutting the radially spread braid end portion into a flush relation with the sleeve end by axially advancing the radially spread braid portion over the chamfered edge of the sleeve;
    axially deforming the tube end into a flush relation with the sleeve end;
    locating the fitting relative to the tube, sleeve, and braid ends; and,
    fusion bonding the fitting to the flush tube, braid, and sleeve ends.

2. The method as defined in claim 1 wherein the locating step includes advancing a gauge over the ends of the tube, braid, and sleeve and thereafter to extend the braid end portion beyond the sleeve end and the tube end removing the gauge.

3. A method of securing a fitting to a flexible metal hose end wherein the flexible metal hose includes a corrugated tube, a braid received over the tube, and a sleeve slidably received over the braid, the method comprising the steps of:
    locating the sleeve a predetermined dimension axially inward from terminal ends of the tube and the braid by advancing a gauge into engagement with the tube end axially inward of the braid end to define an extended braid end portion, and thereafter removing the gauge;
    deforming the sleeve to mechanically interlock the sleeve, braid, and tube together;
    cutting the braid end portion into a flush relation with the sleeve end and tube end to define a generally planar, annular surface;
    axially deforming the tube to define a generally planar, annular surface with an outer end of the sleeve;
    locating a fitting on the surface; and,
    fusing the fitting to the sleeve, braid, and tube.

4. The method as defined in claim 3 comprising the further step of radially spreading the braid end subsequent to the sleeve deforming step.

5. The method as defined in claim 3 wherein the sleeve deforming step is a radially inward swaging step.

6. The method as defined in claim 3 wherein the gauge advancing step includes locating the sleeve end axially inward of the tube end.

7. A method of securing a fitting to a flexible hose that includes a corrugated tube, braid, and sleeve, the method comprising the steps of:
    (a) axially locating a tube end and a braid end outwardly beyond a sleeve end by advancing a gauge into engagement with the tube end and the braid end to axially locate the ends of the tube, braid, and sleeve at desired positions, and thereafter removing the gauge prior to the deforming of step (c);
    (b) swaging the sleeve radially inward adjacent the sleeve end to lock the tube, braid, and sleeve together with the tube and braids extending beyond the sleeve end;

(c) axially deforming the tube end into a flush relation with the sleeve end after the swaging step;

(d) cutting the braid end into a flush relation with the sleeve end and tube end to define a generally planar, annular surface, the cutting step occurring after the swaging step;

(e) positioning an end of a fitting on the annular surface; and (f) fusion bonding the fitting end to the tube end, braid end, and sleeve end to secure the fitting to the flexible hose.

8. The method as defined in claim 7 comprising the further step of radially spreading the braid end after the swaging step and before the cutting step.

* * * * *